(12) United States Patent
Joosten

(10) Patent No.: US 12,050,590 B2
(45) Date of Patent: Jul. 30, 2024

(54) DATA VERIFICATION IN A DISTRIBUTED DATA PROCESSING SYSTEM

(71) Applicant: K.Mizra LLC, Los Angeles, CA (US)

(72) Inventor: Hendrikus Johannes Maria Joosten, S'-Gravenhage (NL)

(73) Assignee: K.Mizra LLC, Cape Coral, FL (US)

( * ) Notice: Subject to any disclaimer, the term of this patent is extended or adjusted under 35 U.S.C. 154(b) by 0 days.

(21) Appl. No.: 17/935,905

(22) Filed: Sep. 27, 2022

(65) Prior Publication Data

US 2023/0015258 A1     Jan. 19, 2023

Related U.S. Application Data

(63) Continuation of application No. 17/196,499, filed on Mar. 9, 2021, now abandoned, which is a
(Continued)

(30) Foreign Application Priority Data

Jun. 20, 2014    (EP) ..................................... 14173275

(51) Int. Cl.
    *G06F 16/23*         (2019.01)
    *G06F 9/46*          (2006.01)
    (Continued)

(52) U.S. Cl.
    CPC .......... *G06F 16/2365* (2019.01); *G06F 9/466* (2013.01); *G06F 9/52* (2013.01); *H04L 67/10* (2013.01)

(58) Field of Classification Search
    CPC ................................................ G06F 16/2365
    (Continued)

(56) References Cited

U.S. PATENT DOCUMENTS 5,784,560 A     7/1998    Kingdon et al.
8,856,089 B1 *   10/2014   Briggs ................ G06F 16/2315
                                                      707/705
(Continued)

FOREIGN PATENT DOCUMENTS

EP          0503765 A2     9/1992
TW        I446266 B   *   7/2014

OTHER PUBLICATIONS

Aug. 2015—International Search Report and Written Opinion of PCT/NL2015/050450.

*Primary Examiner* — Syling Yen
(74) *Attorney, Agent, or Firm* — Kinney & Lange, P. A.

(57) ABSTRACT

A verification device operates to evaluate consistency of input values from a client device used by a server to execute a task. In an example the task may be installation of software into the client device, and the consistency evaluation of the input values may involve evaluating whether identifiers used to obtain attribute values of components of the client device for the installation apply to the same client device. To initiate execution of the task, the client device commands a plurality of data source servers to supply the attribute values. The data source servers return response messages defining the attribute values associated with the identifiers supplied by the client device. The client device supplies the response messages to the server for use in the execution of the task. Before executing the task, the server supplies information from the response messages to a verification device, the information defining a combination of the identifiers of the response messages, as well as the combination of data source servers that have defined attribute values associated with the identifiers. The verification device performing a consistency evaluation on said combination of identifiers, dependent on whether said combination of identifiers is consistent or inconsistent with previously stored combina- (Continued)

tions of identifiers for said combination of data source servers stored for previously executed tasks and/or whether values of a corresponding further attribute associated with the identifiers in the data source servers in the combination of data source servers are consistent. The server selecting between executing the task or not dependent on a result of the consistency evaluation.

16 Claims, 5 Drawing Sheets

Related U.S. Application Data continuation of application No. 15/320,175, filed as application No. PCT/NL2015/050450 on Jun. 19, 2015, now Pat. No. 10,977,237.

(51) Int. Cl.
*G06F 9/52* (2006.01)
*H04L 67/10* (2022.01)

(58) Field of Classification Search
USPC .......................................................... 707/695
See application file for complete search history.

(56) References Cited

U.S. PATENT DOCUMENTS

| | | | |
|---|---|---|---|
| 10,977,237 B2 | 4/2021 | Joosten | |
| 2003/0014658 A1 | 1/2003 | Walker et al. | |
| 2006/0149408 A1* | 7/2006 | Speeter | G06F 8/71 700/126 |
| 2008/0301451 A1 | 12/2008 | Parkinson | |
| 2008/0301666 A1* | 12/2008 | Gordon | G06F 8/65 717/172 |
| 2009/0113397 A1* | 4/2009 | Wright, Sr. | G06Q 30/04 705/34 |
| 2009/0183182 A1* | 7/2009 | Parthasarathy | G06F 9/44568 719/321 |
| 2011/0225461 A1 | 9/2011 | Wookey | |
| 2013/0247183 A1 | 9/2013 | Kumar et al. | |
| 2014/0101061 A1 | 4/2014 | Boudreau et al. | |
| 2015/0277898 A1 | 10/2015 | Deng | |
| 2016/0004545 A1 | 1/2016 | Wang et al. | |

* cited by examiner

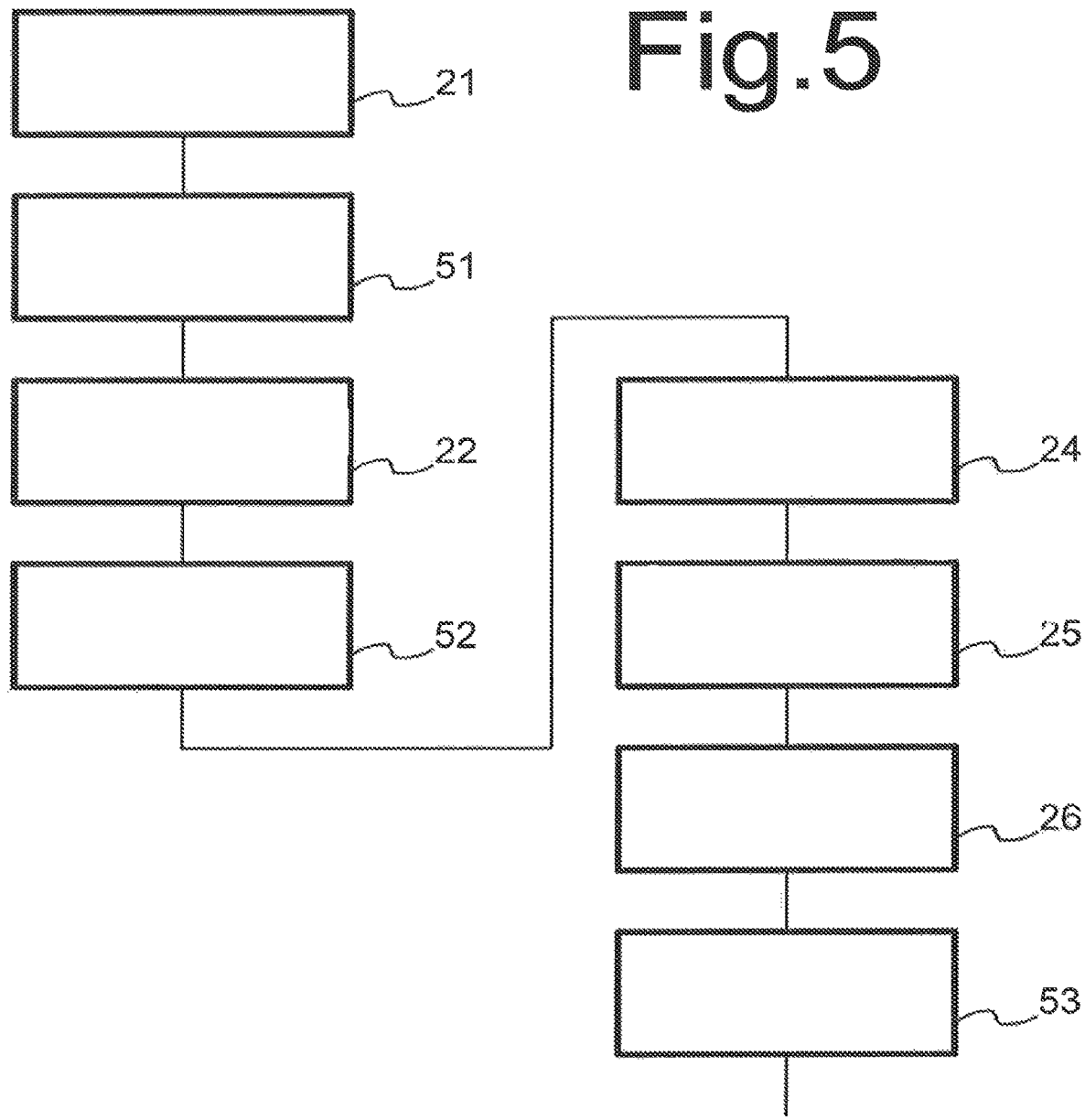

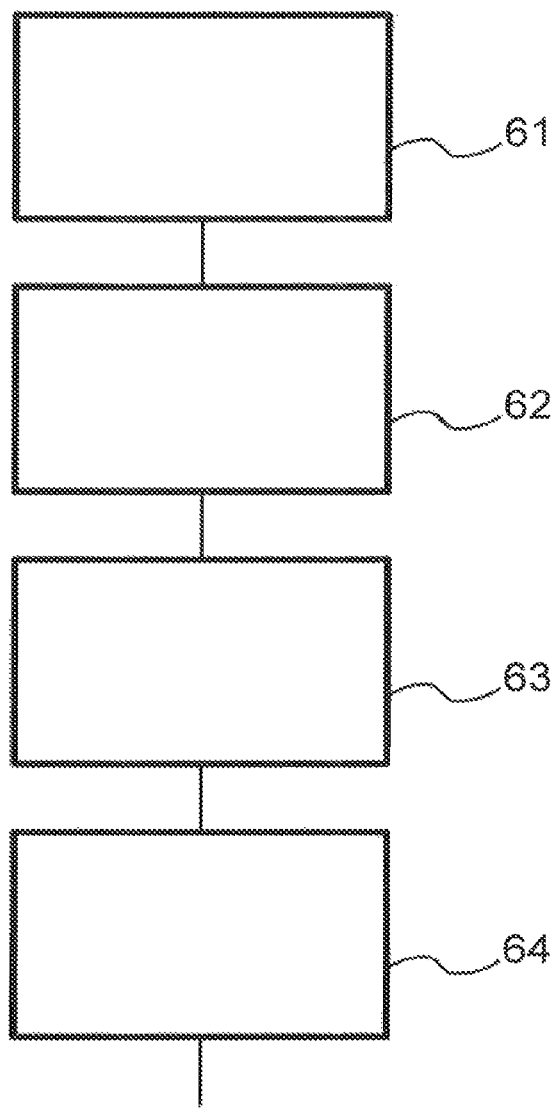

DATA VERIFICATION IN A DISTRIBUTED DATA PROCESSING SYSTEM

CROSS-REFERENCE TO RELATED APPLICATIONS

This application is continuation of U.S. application Ser. No. 17/196,499, filed Mar. 9, 2021, which claims the benefit of U.S. National Stage application Ser. No. 15/320,175, (U.S. Pat. No. 10,977,237) filed Dec. 19, 2016 under 35 U.S.C. § 371 of International Application PCT/NL2015/050450 (published as WO 2015/194957 A1), filed Jun. 19, 2015, which claims the benefit of priority to EP 14173275.0, filed Jun. 20, 2014. Benefit of the filing date of each of these prior applications is hereby claimed. Each of these prior applications is hereby incorporated by reference in its entirety.

FIELD OF THE INVENTION

The invention relates to data verification in a distributed data processing system, an apparatus for use in a distributed data processing system and to a distributed data processing system.

BACKGROUND

When a device in a network environment executes an application program (app), the app usually relies on services from other devices to perform the program. For example, the other devices may be used to provide attribute values for use in an operation that is associated with the app and/or one or more other devices may perform part or all of the operation. In such a distributed environment errors in the execution can result from inconsistency between the actions of the different devices.

For example, installation of software or hardware in a device may require information attributes that identify communication protocols, channels and other parameters of components that will cooperate with the newly installed hardware or software in relation to the device. The hardware or software may need to use the value of such information attributes to cooperate with the components during its operation. Inconsistent values can result in malfunctioning. For a lean component, the value of such an information attribute may be supplied by a supporting server, based on an identification of the component. However, identification errors may cause errors in the operation of the installed software or hardware.

A distributed data processing system is considered wherein a first device (e.g. a server that controls the update) executes a program in interaction with other devices that supply attribute values of objects for use in the execution of the program. Herein the other devices supply the attribute values associated with identifiers to identify aspects of an object. In such a system it is a source of malfunction when wrong identifiers are used.

It would be desirable to detect whether a wrong identifier is used in association with an attribute value in such a distributed data processing system. Unfortunately, identifier errors are hard to detect in a distributed data processing system. Mere differences between the identifiers used for values of different attributes needed for executing a single task for an object need not imply that an identifier is erroneous. Different identifiers may need to be used in association with the same object in the interaction with different supplying devices (e.g. when for a single object, like a device wherein an update must be installed, different identifiers are needed to retrieve attribute values of the same object from different supplying devices, or when identifiers of different components of the same object need to be used to retrieve values of different attributes).

SUMMARY

It is an object to provide for a method and system to protect against erroneous use of identifiers to retrieve information attribute values for use in the execution of a program by a device from other devices in a distributed data processing system.

A method according to claim 1 is provided. Herein a server executes a task dependent on attribute values received from a client device. As mentioned an example of such a task is the installation or update of a component of the client device, using the attribute values to adapt the installation on the properties of other components of the client device with which the installed or updated component interacts. But any task that depends on values of attributes of an object may be considered. The method has the steps of the client device requesting response messages from a plurality of data sources via a communication network, the response message from each data source defining an attribute value that the data source associates with an identifier supplied by the client device;

the client device supplying the response messages, or at least data from the response messages that defines the identifier and the associated attribute value of each response message, to the server via the communication network;

the server supplying information from the response messages to a verification device via the communication network, the information defining a combination of the identifiers of the response messages, as well as the combination of data sources that have defined attribute values associated with the identifiers in the combination of identifiers;

the verification device performing a consistency evaluation on said combination of identifiers, dependent on whether said combination of identifiers is consistent or inconsistent with previously stored combinations of identifiers for said combination of data sources stored for previously executed tasks and/or whether values of a corresponding further attribute associated with the identifiers in the data sources in the combination of data sources are consistent;

the server selecting between executing the task or not dependent on a result of said consistency evaluation.

In the example wherein the task is installation of a component, inconsistency or lack of consistency can be used to prevent an inconsistent installation that would lead to malfunction of the installed component in interaction with other components of the device, or at least to prevention of such an installation until more checks have been performed.

The verification device needs only the identifiers and the data sources involved in obtaining the attribute values to perform a consistency evaluation, and not the attribute values. Although the combination of identifiers may comprise the identifiers from the response messages for all attributes, this is not necessary. For example, a combination of identifiers used for two or more different data sources, but not all, may be used. In an embodiment, the verification device makes use of transaction history, to evaluate whether the identifiers have been used consistently in the same combination for the same combination of data sources for the execution of earlier tasks, or whether an identifier has been combined with another identifier for the execution of an earlier task. In the example wherein the task is installation of a component, such a consistency evaluation shows whether identifiers of a combination of components or a device with a component have been used together for earlier transactions, lending support to the fact that they are part of the same device, or whether other combinations have been used, lending support to a possibility of error. In another or further embodiment, the verification device evaluates the consistency of the values of comparable attributes that the different data sources associate with the different identifiers in a combination. Such comparable attributes will generally be different from the attributes requested from the data sources for use in the execution of the task. When the same object is identified with different identifiers at different data sources, such an evaluation can detect inconsistencies. Also when the identifiers are identifiers of different components of a same object, such an evaluation can detect inconsistencies. The comparable attributes may relate to interaction features like an object build date or a communication protocol or communication speed used between components of within the object for example, which must be the same for different components. An evaluation of consistency of one or more further attributes of identifiers that are supposed to identify the same object in different data sources can be used to lend support to the correctness of their identity. For example differences between pixel number attributes registered for identifiers that are supposed to identify the same device in different data sources could signal inconsistency.

In an embodiment, the consistency evaluation comprises computation of a consistency score, which need not represent a binary consistent-inconsistent result. For example, the consistency score may be computed from a count of the number of previous tasks for which the same combination of identifiers as the current combination was used from the same data sources and/or the number of previous tasks for which identifiers from the current combination of identifiers were used in different combinations from the same data sources, one or both e.g. as a fraction of previous tasks for which any identifier of the current combination was used from the data sources of the combination. As another example, the consistency score may be computed from a count of the number of attributes with consistent values associated with the different identifiers by different data sources. The verification device may compare the score value with a predetermined threshold, or transmit the score value to the server that will execute the task.

BRIEF DESCRIPTION OF THE DRAWINGS

These and other objects and advantageous aspects will become apparent from a description of exemplary embodiments with reference to the following figures.

FIG. 5 shows a flow-chart of an alternative data verification process
FIG. 6 shows a flow-chart of a data verification process

DETAILED DESCRIPTION

Figure 1:
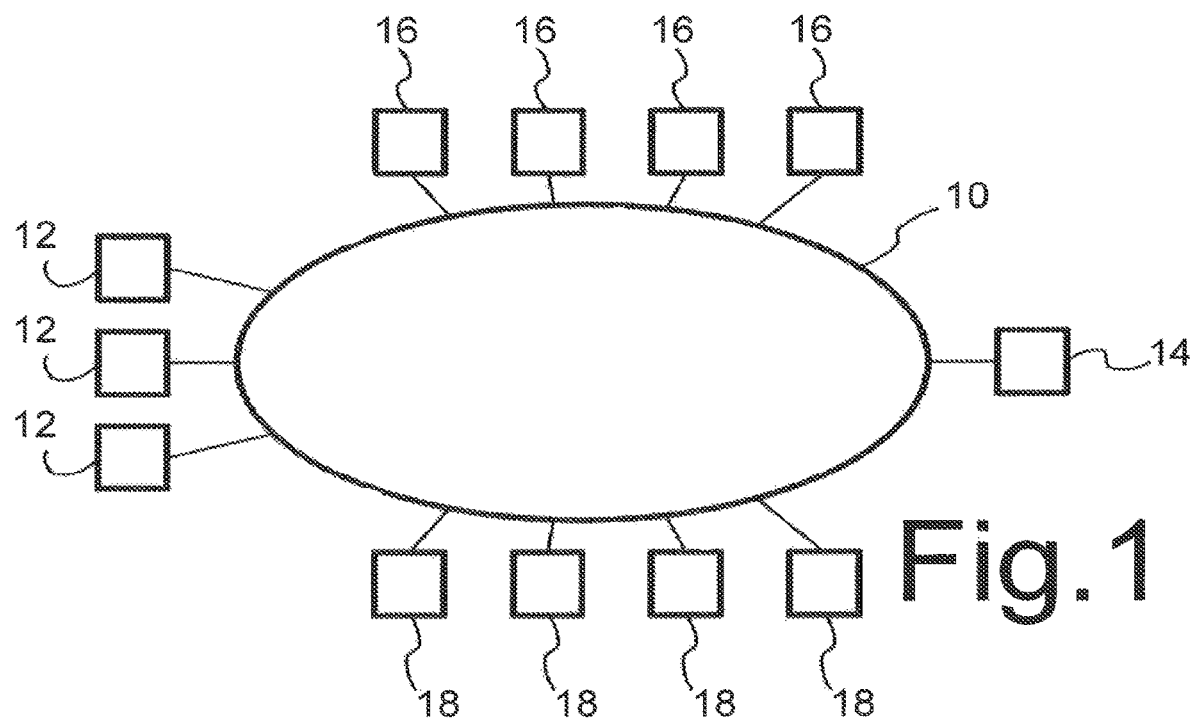
FIG. 1 shows a distributed data processing system.

FIG. 1 shows a distributed data processing system comprising a communication network 10, a plurality of client devices 12, a verification device 14, servers 16 and a plurality of data source servers 18 coupled to each other via communication network 10.

Figure 2:
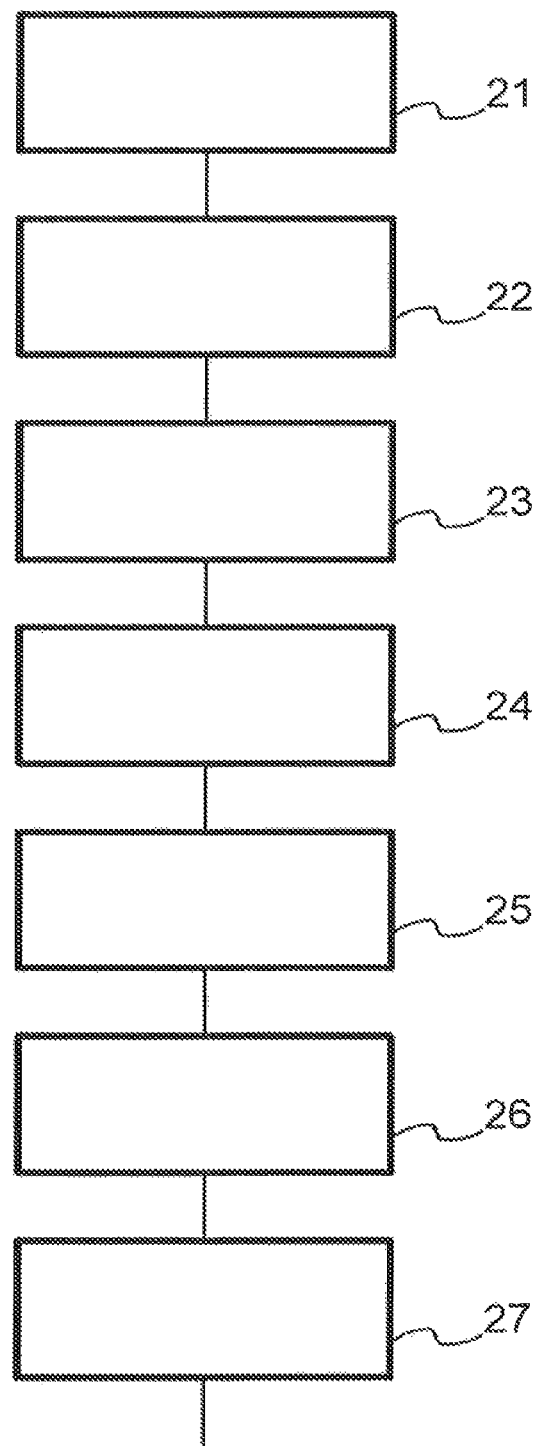
FIG. 2 shows a flow chart of operation of the distributed data system.

FIG. 2 shows a flow chart of operation of the distributed data system. The operation involves execution of a task by a server 16 dependent on data from data source servers 18 relating to a client device 12 . . . . In one example, the task may involve installation of a software component in the client device 12 or an update of a software or hardware component in the client device 12 by the server 16. In this example, the update is assumed to depend on the type and/or attributes of components of client device 12, e.g. a type of display in client device and its resolution, a type of memory present in client device 12 and its maximum speed, a password (key) needed to access a protected memory of client device 12. In the example, different parts of this information about the client device 12 are obtained from, or at least confirmed by, different data source servers 18, based on identifications of the client device 12 at the different data source servers 18.

In a first step 21, server 16 receives a request message, e.g. from a client device 12, to initiate the operation. In a second step 22, server 16 transmits a message or messages to client device 12 specifying the types of data needed for the operation, optionally specifying which data source servers 18 may be used to supply the data.

In a third step 23, client device 12 transmits messages to data source servers 18 specifying the type of data requested, as specified in the message or messages from server 16 and an object identifier for which the information is requested. In the example of installation of an update, this object identifier may identify the component of the client device to which the information applies. In other cases, an identifier of the device 12 at the data source server 18 may be needed as object identifier. In a fourth step 24, client device 12 receives response messages from data source servers 18, including the requested data in association with the object identifiers. In a fifth step 25, client device 12 forwards the response messages to server 16. Optionally, data source servers 18 may be configured to generate and transmit electronically signed response messages, which enable verification that the response messages have not been tampered with. Electronic signing is know per se. In this case client device 12 may forward the signed response messages to server 16, enabling server 16 to test for tampering.

Optionally, when client device 12 has a cache memory for storing response messages, it may test for the availability of appropriate response messages and replace third to fifth steps 23-25 by a step in which the cached response is transmitted if it is available. In an embodiment, third step 23 may comprise including a value of the data, in which case the data source servers 18 may be used to add a confirmation or denial of that value of the data in a response message.

In a sixth step 26, server 16 takes the object identifiers used in the response messages and transmits these object identifiers in one or more verification messages to verification device 14, each in association with an identification of the data source server 18 for which the object identifier was used. In an embodiment, server 16 may forward the response messages to verification device 14 for this purpose. In response, server 16 receives a test result from verification device 14. The test result is positive or negative dependent on whether the object identifiers plausibly relate to a same user device 12. If the test result is positive, server 16 executes a seventh step 27, wherein it performs the requested task, such as updating a component in client device 12 dependent on the values of the requested data. If the test result is negative, server 16 may skip seventh step 27, or return to an earlier step like second step 22 in order to obtain more reliable data. In the embodiment wherein signed response messages from data sources 18 are used, server 16 may be configured to test each response messages to determine whether it has been signed by the data source server 18 that purportedly provided the signed response messages. If server 16 detects that any of the response messages has been tampered with, server skips seventh step 27 and preferably also sixth step 26.

As will be appreciated, the process of FIG. 2 strives to ensure that server 16 performs the task using consistent information for the client device. In the example of the installation of an update of a component of the client device 12, the process is used to ensure that interactions of the component with other components of the client device 12 are consistent with the attributes of those other components, such as their interface protocols, speed of operation etc. These attributes are supplied by data source servers 18 rather than the components themselves, which makes it possible to keep the other components simple and to handle attribute demands that were not foreseen at the time when they were installed.

However, consistency of the process depends on whether the response messages from data source servers 18 apply to the same object, e.g. to the same client device 12. This cannot always be determined from the object identifiers used to request the response messages, because an object like the client device 12 may be associated with different object identifiers in different data source servers 18, for example when the object identifiers apply to different components of the client device 12. Possibly, a same object identifier may even identify different client devices 12 in different data source servers 18, because each data source server 18 may have a different system of identifiers.

The evaluation performed by verification device 14 is used to provide added protection against errors due to inconsistency of the object identifiers. Verification device 14 may perform one or more different evaluations. For example, verification device 14 may be configured to compare attribute values associated with object identifiers used to obtain different response messages for the same task, and signal a problem if the attribute values do not match. This may include comparing values of attributes that are not used for executing the task, i.e. that are used only to ensure consistency.

As another example, verification device 14 may keep a record of combinations of object identifiers used for different tasks. In this example, verification device 14 may determine whether response messages from a same combination of data source servers 18 were used in a recorded previous task as in the current task. If a same object identifier is used for one of these data source servers 18, for both the previous task and the current task, verification device 14 tests whether the object identifier or object identifiers used for the other data source servers 18 are also the same. In cases were the object identifiers refer to the same object such as the client device 12, this can be used to detect inconsistencies. For this it is not necessary that the combination of data source servers 18 is used to supply all response messages needed for the task, but of course the reliability of the test can be improved if this is so.

Data source servers 18 may be configured to obfuscate the object identifiers used in association with the response messages. Obfuscation means that each time that an object identifier is used an obfuscated identifier is selected that can be related to the actual object identifier by the data source server but not by other devices. Due to obfuscation server 16 is not able to use comparison of the object identifiers to evaluate consistency. Similarly, verification device 14 receives no information that enables it to determine the actual object identifiers. This creates a problem for the consistency evaluation used to prevent errors. Comparison of values of attributes that data source servers 18 associate with the obfuscated identifiers enables verification device 14 to evaluate inconsistency in this case. In the case of use of a record of transactions, verification device 14 may compare obfuscated identifiers or request data source servers 18 to compare confirm or deny equality of the actual object identifiers associated with different obfuscated identifiers.

Figure 3:
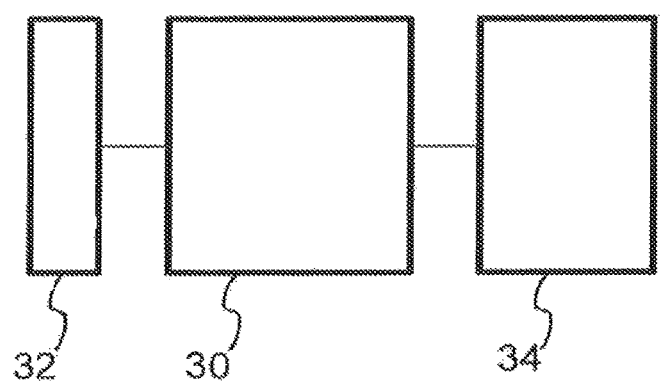
FIG. 3 shows a data verification device

FIG. 3 shows an embodiment of verification device 14, comprising a processor 30, a network interface 32 coupled to processor 30 and a memory 34 coupled to processor 30. In verification device 14 each requested execution of a task according to the process of FIG. 2 is assumed to correspond to an own distinct transaction. Memory 34 stores information for such transactions, the information representing object identifiers used in the transaction and data source servers 18 for which these object identifiers are used. Memory 34 may be a semi-conductor memory or another storage device such as a magnetic disk drive. As will be explained various alternative methods may be used to store information representing object identifiers in memory 34. The information may be supplied directly by data source servers 18, or it may be received via the client device 12 for example.

Figure 4:
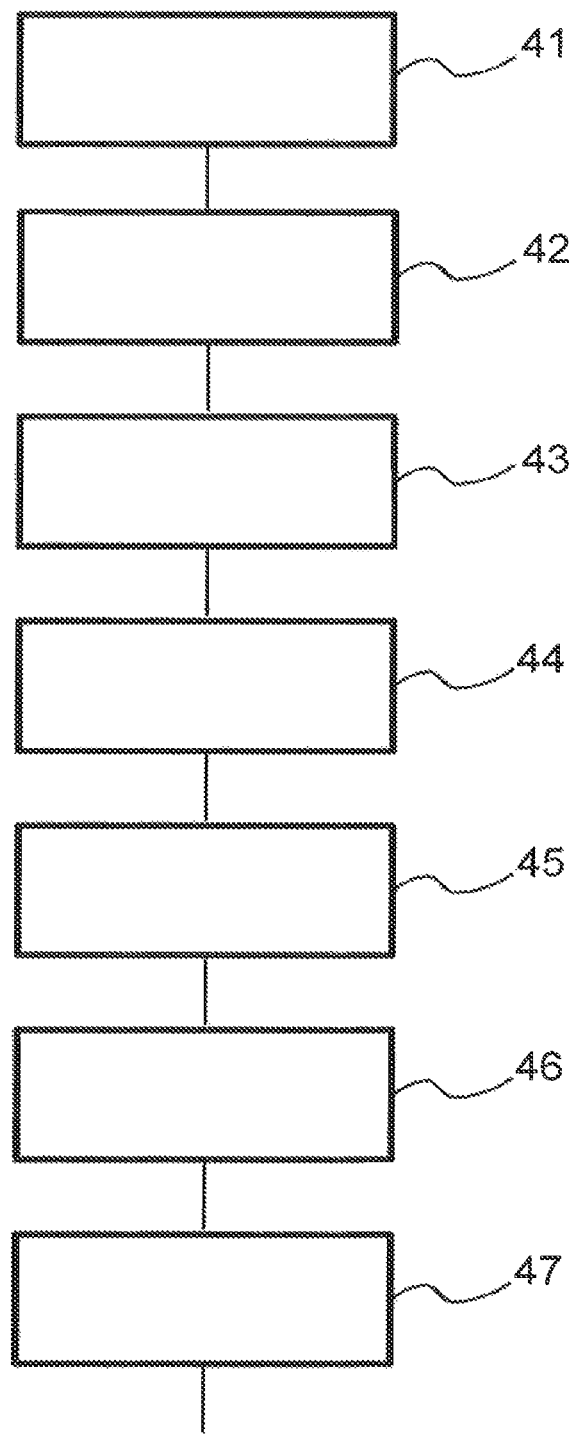
FIG. 4 shows a flow-chart of a data verification process

FIG. 4 shows a flow-chart of an embodiment of data verification by verification device 14. In a first step 41, processor 30 receives one or more verification messages sent from a server 16 in sixth step 26 of the process of FIG. 2 for a current transaction. Optionally, server 16 may send a request to verification device 14, requesting establishment of a transaction identifier prior to transmitting the one or more verification messages, and server 16 may include the transaction identifier in the one or more verification messages to facilitate storage of the object identifiers that the client device 12 used in association with that transaction identifier.

In a second step 42, processor 30 selects a data source server 18 for which an object identifier is used in the current transaction. In a third step 43, processor 30 searches the information stored for previous transactions to detect whether the same object identifier was used for the same data source server 18 in such a previous transaction. In a fourth step 44, processor 30 tests the information of each such previous transaction to determine whether it involved use of one or more of the other data source servers 18 involved in the current transaction. For each of these other data source servers 18, processor 30 compares the object identifiers used for that other data source server in the current transaction and the previous transaction. Based on the comparison, processor 30 computes a score value. Processor 30 may increase the score value for each instance wherein the object identifiers used in the current and previous transaction for the same other data source server match, and it may decrease the score value otherwise.

In an embodiment wherein data source servers 18 and client devices 12 make use of obfuscated object identifiers to communicate information, verification device 14 may be disabled to compare the object identifiers directly. In an embodiment, processor 30 transmits a message to a data source server 18 with the object identifiers for that data source server that should be compared and the data source server 18 returns the result (correspond to the same object identifier or not) of the comparison. Alternatively, processor 30 may be configured to preform a cryptographic comparison.

In an optional fifth step 45, processor 30 selects another data source server 18 for which an object identifier was used in the current transaction, and repeats from third step 43 to update the score value if such another data source server 18 can be determined. Otherwise, processor 30 executes a sixth step 46, wherein it causes network interface 32 to transmit the evaluation result back to the server based on the score value. Fifth step 45 may be omitted for example if a single data source server is used in all transactions, or a fifth step 45 may use a subset of data source servers only if it is known that one data source server from this subset will always be used in a transaction. Optionally, processor 30 may be configured to select the data source server 16 in second step 42 based on an indication of the data source server 18 in a request from server 16.

Although an embodiment of the process has been described that uses a score value, it should be appreciated that processor 30 may compute different score information in different embodiments. For example, processor 30 may establish counts for each combination of at least two data source servers 18 how many previous transactions involved use of the same set of object identifiers for those data source servers 18 in the previous transaction and the current transaction and how many previous transactions involved mismatching sets of object identifiers. If a score value is used, different embodiments may involve changing the score value only for mismatches or only for matches, and score changes of different weights may be associated with different data source servers 18 respectively. Processor 30 may be configured to compare the score value or computed counts with one or more predetermined threshold values, to determine the evaluation result (the test result for consistency) for transmission to server 16 based on that comparison. In an embodiment, the threshold values may be adjusted dependent on how critical consistency is for the task, or on how critical the task is. In an embodiment, server 16 may be configured to indicate the nature of the consistency test to be used to verification device 14, e.g. by supplying values of the thresholds. In this embodiment processor 30 may be configured to execute the consistency test according to the indication received from server 16. In another embodiment processor 30 may be configured to cause transmission of the score value or computed counts to server 16. In this embodiment server 16 compares the score values or counts with one or more threshold values to determine the test result. In the embodiment wherein information representing object identifiers is stored in memory 44 using information received via the client device 12, processor 30 may execute a seventh step 47 after sixth step 46, wherein processor 30 stores information for the current transactions in memory 44, the information representing object identifiers used in the transaction and data source servers 18 for which these object identifiers are used. Subsequently, processor 30 may repeat from first step 41 for a new transaction.

This embodiment may have the effect that verification device 14 can use only part of the transactions if there is more than one verification device 14. This may be a disadvantage. In an embodiment, verification device 14 may be configured to forward this information to other verification devices 14, or to a distributor device (not shown) for distributing this information among verification devices 14.

Alternatively, data source servers may be configured to report object identifiers to verification devices 14 independently. FIG. 5 shows a flow-chart of a process wherein data source servers 18 supply information independent of client device 12. The flow chart is similar to that of FIG. 2, and similar steps have been given the same references. Distinct from FIG. 2, the flow-chart of FIG. 5 comprises a first additional step 51 after first step 21, wherein server 16 communicates with verification device 14 to establish a transaction identifier for the request received in first step 21. Server 16 subsequently includes this transaction identifier in messages to client device 12 and verification device 14. Optionally, server 16 may include a verification identifier that indicates the verification device 14 with which the transaction identifier was negotiated by server 16. Client device 12 includes the transaction identifier and optionally the verification identifier in third step 23, in the messages to data source servers 18.

In a second additional step 52, data source servers 18 that have received a request transmitted by the client device 12 in third step 23 transmit, in response to that request, the transaction identifier and the object identifier from the request to verification device 14, in addition to the transmission of the response to client device 12. If there is a plurality of verification devices 14, data source servers 18 may send the object and transaction identifiers to each verification device 14 or, in an embodiment wherein verification devices 14 forward this information among each other, to a single verification device 14, or to a distributor device (not shown) for distributing this information among verification devices 14. If a verification identifier is used, data source servers 18 may use this verification identifier to direct the object and transaction identifiers to the verification device 14 indicated by the verification identifier.

In a third additional step 53, processor 30 of the verification device 14 receives combinations of a object identifier and an associated transaction identifier from data source servers 18 and records the object identifiers in association with the transaction identifiers in memory 34, for use in the process of FIG. 4. Seventh step 47 is not needed in this case. Verification device 14 may use the transaction identifier to exclude the stored object identifier of the current transaction from the computation of a score value for the current transaction. If cached responses are used, the client device may supply both the transaction identifier of the current transaction and the transaction identifier of the transaction that produced the cached response to server 16, which in turn may supply them to verification device 14, to enable verification device 14 to associated response with a plurality of transactions.

FIG. 6 shows a flow-chart of another embodiment of data verification by verification device 14. Herein attribute values associated with the identifiers are compared. In a first step 61 processor 30 receives one or more verification messages sent from a server 16 in sixth step 26 of the process of FIG. 2. In a second step 62, processor 30 requests and receives values of attributes associated with the object identifiers from the verification message(s) from their associated data source servers 18.

In a third step 63, processor 30 compares the attribute values of corresponding attributes obtained with the object identifiers used for different data source servers 18. Processor 30 may use this to compute a score value or count indicating matches and mismatches, or to signal an error if at least one pair of attribute values does not match. In the example wherein the task is installation of updates for example, the communication protocol and/or data rate attribute values of the device associated with the client device by different data source servers 18 may be compared. In a fourth step 64, processor 30 transmits the evaluation result to server 16 based on the score value or count.

Data source servers 18 may supply the attribute values in encrypted form. If data source servers 18 use homomorphic encryption, processor 30 may compare the attribute values in the encrypted domain without decryption. Use of encrypted attribute values ensures that verification device 14 is disabled from using the attribute values for purposes other than comparison. Because of comparison of attribute values is used, object identifiers that have been obfuscated by data source servers 18 can be used.

The processes of FIGS. 4 and 6 may be combined, so that both matches between combinations of object identifiers from previous transactions and attribute value matches may be used to determine an aggregate evaluation result, for example by combining their contributions to a score value, of by increasing the number of tests (e.g. results of comparisons with thresholds) that must be satisfied to produce a positive test result.

These processes are particularly suited for secure task execution, e.g. for privacy protection. Secured execution may require encryption and/or obfuscation of identifiers, to disable server 16 from obtaining actual identifiers that it could use to obtain information from data source servers 18 targeted at a specific known client device 12. As a result, server 16 is also disabled from comparing identifiers associated with different attributed values. By using the verification device 14 for verification, not only the operation of server 16 is simplified, but it is also avoided that server 16 needs to get access to other transactions, or to more attribute values than necessary. Similarly, it is avoided that data source servers 18 are able to determine the task for which the client device 12 has requested the information.

Thus the processes could also be used for privacy sensitive applications, wherein data source servers 18 may be database servers of government agencies that supply or confirm values of personal attributes of a person associated with an identifier, such as the person's age or sex or residential address. Similarly, data source servers 18 may be database servers of credit rating agencies or banks that supply or confirm values of financial attributes of a person associated with an identifier. In such embodiment, the task executed by server 16 could be to decide whether or not to conclude and perform a contract with the person associated with multiple identifiers, e.g. to deliver a product ordered from client device 12. Embodiments have been described wherein the response messages from data source servers 18 include values of attributes, to serve as a certificate that the value of the attribute is associated with the identifier at a data source server 18. However, alternatively the response messages may merely provide data to certify or deny that a value supplied in the request to the data source server 18 is associated with the identifier in the data source server. This may be used to limit the possibility of information fishing. In this case data source server 18 mainly serves to prevent errors in the values. Cryptographic protocols are known that enable data source servers 18 to perform such tests without obtaining information of the attribute value, or possibly even about the identifier.

The invention claimed is:

1. A method of verifying attribute values obtained from a plurality of data source servers for use in execution of a task by a plurality of servers, the method comprising:
receiving a request at a server from the plurality of servers from a client device to initiate the task;
transmitting, by the server, to the client device needed data types for the task;
requesting, by the client device, the attribute values from the plurality of data source servers, wherein the attribute values comprise the needed data types for the task and an object identifier;
receiving, by the client device, the attribute values from the plurality of data source servers;
transmitting, by the client device, the object identifier from the attribute values to the server;
transmitting, by the server, the object identifier from the attribute values in one or more verification messages to a verification device; and
analyzing, by the verification device, the one or more verification messages;
executing the task when a positive result is determined by the verification device, by the client device, based, at least in part, on the analyzing by the verification device;
wherein the analyzing, by the verification device, the one or more verification messages further comprises searching information stored from previous transactions to detect whether the same object identifier was used for the same data source server; and
based on the detecting whether the same object identifier was used for the same data source server from the plurality of data source servers, a process of the verification device computes a score.

2. The method of claim 1, wherein the verification messages further comprise an association of the data source server from the plurality of data source servers from which the object identifier was requested.

3. The method of claim 1, wherein the searching information stored from previous transactions is repeated for each data source server from the plurality of data source servers that was used in the task.

4. The method of claim 1, wherein the executing the task is based on the score surpassing a threshold and wherein the threshold is dependent on the sensitivity of the task.

5. The method of claim 1 wherein the score is incremented when the same object identifier was used for the same data source server from the plurality of data source servers as in previous transactions and wherein the score is decremented when a different object identifier was used for the same data source server from the plurality of data source servers as in previous transactions.

6. The method of claim 1, wherein the attribute values from the plurality of data source servers received by the client device are electronically signed.

7. The method of claim 1, wherein the object identifier from the attribute values transmitted by the client device to the server are electronically signed.

8. The method of claim 1, wherein the attribute values received from the plurality of data source servers by the client device are encrypted with a homomorphic encryption.

9. The method of claim 8, wherein when analyzing, by the verification device, the one or more verification messages, the one or more verification messages are compared without decryption.

10. A verification device for verifying attribute values received by a server from a client device for use in execution of a task, wherein the verification device comprises:
a network interface for communicating with the server;
a storage device for storing previous transactions; and
a processor configured to:
receive one or more verification messages from the server, the verification messages comprising an object identifier and needed data types for use in execution of the task;

analyze the one or more verification messages by searching the previous transactions stored on the storage device to detect whether the same object identifier was used for each data source server from a plurality of data source servers;

transmit a result of the analysis to the server via the network interface;

wherein based on the detecting whether the same object identifier was used for the same data source server from the plurality of data source servers, the verification device computes a score; and wherein the score is incremented when the same object identifier was used for the same data source server from the plurality of data source servers as in previous transactions and decremented when a different object identifier was used for the same data source server from the plurality of data source servers as in previous transactions.

11. The method of claim 10, wherein the verification messages further comprise an association of the data source server from the plurality of data source servers from which the object identifier was requested.

12. The method of claim 10, wherein searching the previous transactions stored on the storage device is repeated for each data source server from the plurality of data source servers that were used in execution of the task.

13. The method of claim 10, wherein the result that is transmitted is a determination of whether the score surpasses a threshold and wherein the threshold is dependent on the sensitivity of the task.

14. The method of claim 10, wherein the object identifiers and the needed data types in the one or more verification messages are homomorphically encrypted.

15. The method of claim 14, wherein the analysis of the one or more verification messages is performed without decryption.

16. The method of claim 10, wherein the one or more verification message from the server are stored on the storage device.

* * * * *